3,169,986
PERACID PRODUCTION BY ESTER-H₂O₂ REACTION
Reginald Francis Webb, Cambridge, and David Guy Large, Hadstock, England, assignors to Ciba Limited, Basel, Switzerland, a company of Switzerland
No Drawing. Filed Mar. 21, 1961, Ser. No. 97,166
Claims priority, application Great Britain, Mar. 22, 1960, 10,170/60
6 Claims. (Cl. 260—502)

This invention relates to the production of peracids.

Current methods for the production of peracids employ the reaction between hydrogen peroxide and an organic acid in the presence of a strong mineral acid which results in an equilibrium mixture of the hydrogen peroxide, the organic acid, the peracid and water, the reversible reaction being represented as

$$R.COOH + H_2O_2 \rightleftharpoons R.CO_3H + H_2O$$

Maximum yields of the peracid are attained by the use of an excess of the organic acid or hydrogen peroxide or by displacing the above equilibrium reaction by removal of water either by the use of relatively large quantities of a dehydrating agent such as sulfuric acid as described in Patent No. 2,813,896, patented November 19, 1957, by Heinrich Krimm, or by azeotropic removal of water with a suitable inert solvent as described in British patent specification No. 803,159, patented July 29, 1957, by Benjamin Phillips et al. Alternatively the equilibrium may be displaced by consuming the peracid as it is formed, e.g., by an in situ oxidation.

Other methods for the production of peracid solutions employ the reaction of hydrogen peroxide or alkali metal peroxides with anhydrides or acid chlorides derived from the organic acids, but elaborate precautions are necessary to ensure that the peracid produced is free from diacyl peroxides. Furthermore, methods employing acid anhydrides are wasteful in that two moles of parent acid are required per mole of peracid product.

It has now surprisingly been found that a solution of a peracid in an ester (which solution is free from water and free from the corresponding acid and other deleterious materials which may interfere with subsequent processes employing the peracid such as epoxidation and other oxidations) may be formed by the direct interaction of hydrogen peroxide and an ester of an organic carboxylic acid of which the ester radical contains at least two carbon atoms.

According to the present invention therefore a process for the production of a peracid comprises reacting hydrogen peroxide with an ester of an organic carboxylic acid of which the ester radical contains at least two carbon atoms, in the presence of an acid catalyst, i.e., a catalytic quantity of an acid or of a substance capable of acting as an acid under the conditions of the reaction.

The method of the present invention avoids the disadvantages of the prior methods referred to above and has the particular merit that it provides a solution of the peracid in an inert solvent which is free from the parent acid and from water and which is therefore eminently suitable for subsequent use as the oxidising agent in peroxidation and other oxidising reactions, or alternatively provides a convenient in situ oxidation method when peracid is produced in the aforesaid manner in the presence of an oxidisable substance.

The production of the peracid solutions according to the present invention involves the addition of hydrogen peroxide, generally but not necessarily in aqueous solution, to the ethyl or higher alkyl ester, followed by removal of any water present, preferably by distillation. In certain cases the ester itself forms an azeotrope with water and affords a method for the removal of water at a temperature insufficiently high to effect distillation or decomposition of the hydrogen peroxide. In the event of this simple process not being applicable, additional inert solvents may be added which enable the water to be removed as an azeotrope of conveniently low boiling point. After removal of the water and the preparation of a substantially anhydrous solution of hydrogen peroxide in the ester or ester-solvent mixture, the mixture is allowed to react. An acid catalyst is added and, to increase the rate of formation of peracid, the mixture may be heated. It is preferable to remove the water as previously described prior to adding the acid catalyst. If the acid catalyst is added before removing the water reaction will begin before the water removal stage is complete and the peracid formed may distil with the azeotrope.

The products of the reaction mixture contain the peracid in admixture with residual ester, parent alcohol, small amounts of unused hydrogen peroxide and any added solvent and acid catalyst. Removal of the hydrogen peroxide, alcohol and the acid catalyst may, if desired, be effected by known procedures such as washing with water, or aqueous alkali metal carbonate or bicarbonate solutions, or by distillation. In the special case hereinafter discussed where the acid catalyst comprises an insoluble material such as a cation-exchange resin, simple filtration will effect its removal from the reaction mixture.

Esters which may be employed in the process of the invention include esters of aliphatic, cycloaliphatic and aromatic mono- or polycarboxylic acids with alcohols of two or more carbon atoms which are not readily oxidised by peracids; primary, secondary and tertiary alcohols may be used as components of the ester but the formation of peracids from esters of tertiary alcohols is slow and these esters are not preferred.

Suitable acid catalysts for the reaction include strong mineral acids such as sulphuric acid, phosphoric acid, perchloric acid and hydrogen chloride, strong organic acids such as trifluoroacetic acid, toluene-p-sulphonic acid, methanesulphonic acid, or cation exchange resins in the acid form, such as sulphonated polystyrene-divinyl benzene copolymers, for example those commonly solid under the trademarks Amberlite I.R. 120, Zeocarb 225 and Dowex-50, or other acid-reacting substances such as acid salts, e.g., potassium dihydrogen phosphate, potassium hydrogen sulphate and the class of acid-reacting substances generally known as Lewis acids and including such substances as boron trifluoride, zinc chloride and stannic chloride.

The reaction proceeds at temperatures within the range from room temperature to the boiling point of the reactant solution. In certain cases, e.g., where it is desired to remove continuously the higher boiling alcohol produced in the reaction, it is convenient to operate the process under reduced pressure.

The present invention is illustrated in the following examples, in which the parts and percentages given are by weight:

EXAMPLE I

*Preparation of peracetic acid*

(a) A solution of anhydrous hydrogen peroxide in n-propyl acetate was prepared by the addition of 40 parts of an 85% aqueous solution of hydrogen peroxide to 204 parts of n-proplyl acetate and azeotropic removal of the water by distillation at 65 mm. and 46° C. using a Dean and Stark head. Fifteen parts of a sulphonated polystyrene-divinyl benzene copolymer (Dowex-50) was added and the solution refluxed at 46° C. under a pressure of 65 mm. After 1.5 hours, analysis of the solution by the method of Swern (Organic Reactions, vol. VII, 1953, p. 392) indicated that the solution contained 34.1 parts of peracetic acid and 16.9 parts of unchanged hydrogen peroxide. The yield of peracetic acid based upon hydrogen peroxide consumed was 91%.

The above solution was filtered from the ion-exchange resin and cyclohexene added. After 3 hours at 30° C. the solution was worked up to give cyclohexene oxide in good yield.

(b) Essentially the same concentration of peracetic acid in n-propyl acetate was obtained when the ion-exchange resin used above was replaced by concentrated sulphuric acid (2 parts).

EXAMPLE II

*Preparation perbenzoic acid*

To a solution of hydrogen peroxide (6.8 parts), ethylbenzoate (150 parts) and benzene (172 parts), Dowex–50 (15 parts, acid form) was added and the mixture refluxed for 3 hours. A yield of 28% based on peroxide consumed was obtained.

EXAMPLE III

*Preparation of perphthalic acid*

To a solution of hydrogen peroxide (10.8 parts), dibutyl phthalate (278 parts) and benzene (172 parts), Dowex–50 (15 parts, acid form) was added and the mixture maintained at 82° C. for 3 hours. 3.2 parts of the peracid were formed.

EXAMPLE IV

To a solution of hydrogen peroxide (13 parts), diethyl carbonate (118 parts) in benzene (172 parts), Dowex–50 (15 parts, acid form) was added and the mixture refluxed at 40° C./120 mm., for 3.75 hours. 3.4 parts of the peracid were formed.

Diethyl carbonate used in this example is regarded as an ester of a carboxylic acid since it is the ethyl ester of the unknown ethoxy carboxylic acid of the formula:

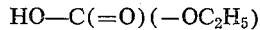

$$HO—C(=O)(—OC_2H_5)$$

EXAMPLE V

*Preparation of peracetic acid*

To an anhydrous solution of hydrogen peroxide (175 parts) in methylene dichloride (2000 parts) and iso-propylacetate (1020 parts), Zeocarb 225 (100 parts, acid form) was added and the solution refluxed using a Dean and Stark head. After 1.75 hours the solution contained hydrogen peroxide (130 parts) and peracetic acid (101 parts), after a further 3 hours the solution contained hydrogen peroxide (98 parts) and peracetic acid (160 parts) and after a further 2 hours the solution contained hydrogen peroxide (74 parts) and peracetic acid (191 parts) representing a yield of the peracid of 85% based upon consumed hydrogen peroxide.

EXAMPLE VI

*Preparation of peracetic acid*

An anhydrous solution of hydrogen peroxide (81.3 parts), methylene dichloride (3000 parts) and tert-butyl acetate (695 parts) was prepared, and to it was added Zeocarb 225 (100 parts, acid form). The solution was refluxed and after 2 hours was found to contain 22.4 parts hydrogen peroxide and 65 parts peracetic acid. After a further 1 hour the solution contained 15 parts unchanged hydrogen peroxide and 70.5 parts peracetic acid, representing a yield of 48% of the peracid based upon hydrogen peroxide consumed.

EXAMPLE VII

*Preparation of peracetic acid*

A solution of anhydrous hydrogen peroxide (36.2 parts) in ethyl acetate (176 parts) was treated with the cationic exchange resin Zeocarb 225 and refluxed at 40–42° C. (160–170 mm. pressure) under a column 2′ × 1.5″) packed with Fenske helices. A distillate was removed slowly from the top of the column and fresh ethy acetate was added at a similar rate, to the reaction mixture. After 10 hours the solution was found to contain 71.5 parts of peracetic acid and 4.4 parts unreacted hydrogen peroxide. The yield of peracetic acid based upon hydrogen peroxide consumed was 96%.

EXAMPLE VIII

*Preparation of performic acid*

A solution of anhydrous hydrogen peroxide (15.0 parts) in ethyl formate (74 parts) was treated with concentrated sulphuric acid (1 part) at 20° C. After 1.5 hours the solution was found to contain 9.6 parts of performic acid together with 9.6 parts of unchanged hydrogen peroxide. Based on hydrogen peroxide consumed the yield of performic acid was 97%.

EXAMPLE IX

*Preparation of persuccinic acid*

A solution of diethyl succinate (87 parts), anhydrous hydrogen peroxide (8.5 parts) and concentrated sulphuric acid (2 parts) in 1:2-dichloroethane (200 parts) was stirred and refluxed at 38° C. (and a pressure of 125 mm.) under a fractionating column equipped with a partial return distillation head. Distillate was removed slowly from the top of the column and fresh 1:2-dichloroethane was added periodically to keep constant the volume of the reaction mixture. After 4–5 hours the solution contained 26.5 parts of persuccinic acid and 0.5 part of unreacted hydrogen peroxide indicating a yield of 84% of the peracid based upon peroxide consumed.

EXAMPLE X

*Preparation of perphthalic acid*

A mixture of anhydrous hydrogen peroxide (17.0 parts) diethyl phthalate (222 parts) concentrated sulfuric acid (2 parts) and 1:2-dichloroethane was stirred and refluxed in a similar apparatus and manner to that described in Example IX. After 6 hours the solution was found to contain 6.9 parts of the peracid and 10.2 parts of unreacted hydrogen peroxide.

EXAMPLE XI

*Preparation of peracetic acid*

To an anhydrous solution of hydrogen peroxide (169 parts) in dichloro-methane (2000 parts) and iso-propyl acetate (1020 parts) concentrated sulfuric acid (20 parts) was added and the solution refluxed using a Dean and Stark head; after 4.0 hours the solution contained unchanged hydrogen peroxide (63.5 parts) and peracetic acid (218 parts) representing a yield of the peracid of 93% based upon consumed hydrogen peroxide.

EXAMPLE XII

*Preparation of peradipic acid*

An anhydrous solution of hydrogen peroxide (106 parts), diethyl adipate (2020 parts) and 1:2-dichloroethane (3000 parts) was prepared) and to it was added concentrated sulfuric acid (20 parts). The solution was then refluxed in an apparatus and manner similar to those described in Example IX.

After 2 hours the solution was analyzed for hydrogen peroxide (29 parts) and mono-peradipic acid (234 parts) indicating a yield of 64% of the mono per-acid based upon the hydrogen peroxide consumed.

EXAMPLE XIII

*Preparation of peroxalic acid*

A solution of hydrogen peroxide (179 parts) diethyloxalate (1460 parts), and concentrated sulfuric acid (20 parts) in 1:2-dichloro-ethane (2500 parts) was prepared and refluxed in an apparatus and in the manner described in Example IX. After 3 hours the solution was found to contain hydrogen peroxide (113 parts) and mono-peroxalic acid (138 parts). This represents a yield of peracid of 67% based upon the hydrogen peroxide consumed.

EXAMPLE XIV

*Preparation of perpropionic acid*

Concentrated sulfuric acid (50 parts) was added to a solution of anhydrous hydrogen peroxide (350 parts) in ethyl propionate (2040 parts). The solution was refluxed at 45° C. and at a pressure of 105 mm. in an apparatus provided with a fractionating column packed with Fenske helices and surmounted by a partial return distillation head. Distillate (1320 parts) was slowly removed during 7 hours and the volume of the reaction mixture was kept constant by periodic addition of more ethyl propionate. After 7 hours the reaction mixture was found to contain unreacted hydrogen peroxide (19 parts) and perpropionic acid (800 parts) reresenting a yield of peracid of 91% based upon hydrogen peroxide consumed.

EXAMPLE XV

*Preparation of peracetic acid*

To a solution of anhydrous hydrogen peroxide (177 parts) in ethyl acetate (590 parts) was added boron trifluoride-ethyl ether complex (10 parts). The resulting reaction mixture was kept at a temperature of 20° C. for 5 hours. The solution then contained hydrogen peroxide (137 parts) and peracetic acid (66 parts). Based upon the hydrogen peroxide consumed this was a 75% yield of peracetic acid.

In separate experiments, substantially similar results were obtained using instead of the boron trifluoride-ethyl ether complex as catalyst one of the following substances: stannous chloride, potassium hydrogen sulfate and hydrogen fluoride.

What is claimed is:

1. A process for the production of a peracid wherein a mixture consisting essentially of anhydrous hydrogen peroxide and an ester of an organic carboxylic acid of which the alcohol moiety contains at least two carbon atoms and an acid catalyst, the initial reaction mixture being substantially anhydrous, is reacted at a temperature ranging from room temperature to the boiling point of the reactant solution.

2. A process according to claim 1, wherein aqueous hydrogen peroxide is mixed with the ester, the water is removed by distillation and the acid catalyst then added.

3. A process according to claim 2, wherein the water is removed as an azeotrope.

4. A process according to claim 1, wherein the acid catalyst is sulfuric acid.

5. A process according to claim 1, wherein the acid catalyst is a cation-exchange resin.

6. A process according to claim 1, wherein the acid catalyst is a Lewis acid.

References Cited in the file of this patent

UNITED STATES PATENTS

| | | |
|---|---|---|
| 2,448,252 | Cornthwaite et al. | Aug. 31, 1948 |
| 2,806,045 | Gross | Sept. 10, 1957 |
| 2,814,641 | Phillips et al. | Nov. 26, 1957 |